US012640634B2

(12) United States Patent
Riddell

(10) Patent No.: US 12,640,634 B2
(45) Date of Patent: May 26, 2026

(54) ENERGY GENERATOR FOR ELECTRICAL ENERGY GENERATION WITH NON-RIGID TRIP MECHANISM

(71) Applicant: WePower Technologies LLC, Sagaponack, NY (US)

(72) Inventor: Michael Joseph Riddell, Glastonbury, CT (US)

(73) Assignee: WePower Technologies LLC, Sagaponack, NY (US)

( * ) Notice: Subject to any disclaimer, the term of this patent is extended or adjusted under 35 U.S.C. 154(b) by 185 days.

(21) Appl. No.: 18/404,588

(22) Filed: Jan. 4, 2024

(65) Prior Publication Data

US 2024/0223057 A1 Jul. 4, 2024

Related U.S. Application Data

(60) Provisional application No. 63/437,113, filed on Jan. 4, 2023.

(51) Int. Cl.
*H02K 35/02* (2006.01)
(52) U.S. Cl.
CPC .................................... *H02K 35/02* (2013.01)
(58) Field of Classification Search
CPC ........ H02K 35/02; H02K 35/04; H02K 35/06; H02K 35/08; H02K 35/10; H02K 35/12; H02K 35/16; H02K 35/18
USPC .................................... 310/15–28, 12.12, 88
See application file for complete search history.

(56) References Cited

U.S. PATENT DOCUMENTS

| | | | | |
|---|---|---|---|---|
| 4,140,932 | A * | 2/1979 | Wohlert ................. | H02K 35/02 |
| | | | | 315/130 |
| 5,736,797 | A * | 4/1998 | Motohashi ............. | H02K 33/16 |
| | | | | 318/128 |
| 10,277,104 | B2 * | 4/2019 | Takahashi .............. | H02K 33/16 |
| 10,355,623 | B1 | 7/2019 | Yavid | |
| 10,720,823 | B1 * | 7/2020 | Kim ......................... | H02K 1/02 |
| 11,619,065 | B2 * | 4/2023 | Kalbande .............. | F24C 15/024 |
| | | | | 219/678 |
| 11,936,269 | B2 * | 3/2024 | Amin-Shahidi ....... | H02K 33/18 |

(Continued)

FOREIGN PATENT DOCUMENTS

WO 2024148171 A1 7/2024

*Primary Examiner* — Maged M Almawri
(74) *Attorney, Agent, or Firm* — Mintz Levin Cohn Ferris Glovsky and Popeo, P.C.

(57) ABSTRACT

A system comprises a movable cover including engagement members and an energy generator actuation component, the energy generator actuation component being detachably positioned in the movable cover, a non-rigid material is wound on an outer surface of the movable cover, the energy generator actuation component includes an enclosure that includes an aperture in the enclosure and protrusions disposed on parts of an outer surface of the enclosure, the protrusions including apertures, a primary magnet positioned in the aperture of the enclosure, and secondary magnets. Each of the secondary magnets is positioned in a respective one of the respective additional apertures. Further, the primary magnet is maintained in a first position relative to the secondary magnets. Further, the wires are wound along the outer surface of the enclosure, and the primary magnet moves from the first position to a second position responsive to alteration of the non-rigid material.

18 Claims, 14 Drawing Sheets

(56)          References Cited

U.S. PATENT DOCUMENTS

| | | | |
|---|---|---|---|
| 11,949,310 B2 * | 4/2024 | Hashimoto | H02K 33/16 |
| 2003/0155827 A1 * | 8/2003 | Cheung | H02K 35/02 |
| | | | 310/90.5 |
| 2005/0001703 A1 * | 1/2005 | Zimmerling | H02K 35/02 |
| | | | 335/220 |
| 2006/0234669 A1 * | 10/2006 | Rode | H02K 7/1853 |
| | | | 455/343.1 |
| 2006/0255664 A1 * | 11/2006 | Kraus | H02K 33/16 |
| | | | 310/36 |
| 2007/0194634 A1 * | 8/2007 | Roberts | H02K 35/02 |
| | | | 310/23 |
| 2008/0001484 A1 * | 1/2008 | Fuller | H02K 33/16 |
| | | | 310/15 |
| 2008/0174187 A1 * | 7/2008 | Erixon | H02K 33/16 |
| | | | 310/15 |
| 2009/0134721 A1 * | 5/2009 | Zimmerling | H02K 35/02 |
| | | | 310/15 |
| 2009/0212645 A1 * | 8/2009 | Theuss | H02K 35/02 |
| | | | 310/15 |
| 2010/0277010 A1 * | 11/2010 | Jeon | H02K 33/18 |
| | | | 310/25 |
| 2014/0132187 A1 * | 5/2014 | Mori | G02B 7/1821 |
| | | | 318/128 |
| 2015/0130297 A1 | 5/2015 | Yeh et al. | |
| 2015/0279598 A1 * | 10/2015 | Matsumoto | H01H 47/22 |
| | | | 335/205 |
| 2016/0006332 A1 * | 1/2016 | Liao | H02K 33/16 |
| | | | 310/29 |
| 2017/0346376 A1 * | 11/2017 | Kim | H02K 15/02 |
| 2020/0037459 A1 | 1/2020 | Liu | |
| 2020/0195117 A1 * | 6/2020 | Ohishi | H02K 35/02 |
| 2020/0251973 A1 * | 8/2020 | Kim | H02K 3/02 |
| 2021/0135543 A1 * | 5/2021 | Deak, Sr. | H02K 1/34 |

* cited by examiner

ENERGY GENERATOR FOR ELECTRICAL ENERGY GENERATION WITH NON-RIGID TRIP MECHANISM

CROSS-REFERENCE TO RELATED APPLICATIONS

This application claims the benefit of U.S. Provisional Application having U.S. Provisional Application Ser. No. 63/437,113, titled "TRIP MECHANISM BASED ENERGY GENERATOR FOR ELECTRICAL ENERGY GENERATION," the contents of which are incorporated by reference herewith in their entirety.

TECHNICAL FIELD

The present disclosure is generally directed towards energy harvesting generators for generating electrical energy, and more particularly, to trip mechanisms implemented in association with these generators for electrical energy generation.

BACKGROUND

Various types of energy harvesting generators are currently available. These generators may be based on or include piezoelectric components, one or more magnets, or other components and operate on impulse-based actuation to generate electrical energy. For example, energy harvesting generators may be positioned within industrial switches and other comparable devices and include one or more lever arms or protrusions that operate as actuators to make or maintain contact with various portions of one or more energy generating magnets in order to cause energy transfer and generation. Contact with these portions may result in movement of these magnets, which in turn enables the electromagnetically-induced generation of electrical energy that is used for the purpose of powering various devices.

SUMMARY

In some variations, one or more of the features disclosed herein includes the following features, which can optionally be included in any feasible combination.

Trip mechanism based electrical energy generator systems and apparatus are provided. In one aspect, there is provided an electrical energy generator system that comprises a movable cover including a plurality of engagement members and an energy generator actuation component. In some aspects, the energy generator actuation component can be detachably positioned in the movable cover. In some aspects, a non-rigid material can be wound along a portion of an outer surface of the movable cover. The energy generator actuation component can include an enclosure that can include an aperture in a center of the enclosure and a plurality of protrusions disposed on parts of an outer surface of the enclosure. The plurality of protrusions can include respective additional apertures, a primary magnet positioned in the aperture in the center of the enclosure, and a plurality of secondary magnets. Each of the plurality of secondary magnets can be positioned in a respective one of the respective additional apertures and the primary magnet can be maintained in a first position relative to the plurality of secondary magnets by the plurality of engagement members. In some aspects, a plurality of turns of wire can be wound along the outer surface of the enclosure, and the primary magnet can move from the first position to a second position responsive to alteration of the non-rigid material.

In some aspects, the plurality of turns of wire can be formed of copper. In some aspects, the non-rigid material can be paper and the alteration of the non-rigid material can correspond to dissolution of the non-rigid material.

In some aspects, the second position can be orthogonal to the first position and the movable cover can include an extension that contacts the non-rigid material that can be wound along the portion of an outer surface of the movable cover. In some aspects, the primary magnet can be maintained in the first position relative to the plurality of secondary magnets by the plurality of engagement members that can engage a plurality of extensions disposed on an outer surface of the primary magnet. In some aspects, in the second position, the plurality of engagement members of the movable cover can disengage from the plurality of extensions disposed on the outer surface of the primary magnet. In some aspects, the movement of the primary magnet from the first position to the second position can be in response to the dissolution of the non-rigid material. In some aspects, the movement can comprise angular movement of the primary magnet from the first position to the second position.

In some aspects, the angular movement of the primary magnet from the first position to the second position can comprise the primary magnet oscillating relative to a longitudinal axis. In some aspects, in the second position, the plurality of engagement members of the movable cover can disengage from the plurality of extensions disposed on the outer surface of the primary magnet for enabling the angular movement of the primary magnet from the first position to the second position. In some aspects, the plurality of secondary magnets can be positioned opposite the primary magnet. In some aspects, a magnetic pole of one of the plurality of secondary magnets can face the primary magnet and an additional magnetic pole of an additional one of the plurality of secondary magnets can face the primary magnet. In some aspects, the primary magnet can be cylindrical and the movable cover can be formed of metal.

In another aspect, an electrical energy generator apparatus can comprise a movable cover including a plurality of engagement members and an energy generator actuation component. In some aspects, the energy generator actuation component can be detachably positioned in the movable cover. A non-rigid material can be wound along a portion of an outer surface of the movable cover. The energy generator actuation component can include an enclosure that includes an aperture in a center of the enclosure and a plurality of protrusions disposed on parts of an outer surface of the enclosure. In some aspects, the plurality of protrusions include respective additional apertures, a plurality of secondary magnets, and a primary magnet positioned in the aperture in the center of the enclosure. In some aspects, each of the plurality of secondary magnets can be positioned in a respective one of the respective additional apertures, wherein the primary magnet can be maintained in a first position relative to the plurality of secondary magnets by the plurality of engagement members. A plurality of turns of wire can be wound along the outer surface of the enclosure. In some aspects, the primary magnet performs an angular movement from the first position to a second position responsive to dissolution of the non-rigid material, wherein the angular movement comprises the primary magnet oscillating relative to a longitudinal axis.

In some aspects, the non-rigid material can be paper, wax, or can be formed of a dissolvable plastic and the plurality of turns of wire can be formed of copper. In some aspects, the second position can be orthogonal to the first position.

In another aspect, a system comprises an enclosure including at least a primary magnet, a tray, and at least a secondary magnet disposed on a surface of the tray. In some aspects, the primary magnet moves from a first positon to a second position responsive to a movement of the enclosure relative to the tray. The first position corresponds to a resting position and the second position is at an orientation of approximately 180 degrees relative to the first position.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed aspects. In the drawings.

DETAILED DESCRIPTION

Energy harvesting generators can operate on impulse-based actuation in order to generate electrical energy. For example, energy harvesting generators can be positioned within industrial switches and other comparable devices, which can include one or more actuator lever arms or members that operate to contact various portions of one or more magnets within these energy harvesting generators in order to initiate movement of these magnets, which in turn impart and enable for the generation of electromagnetic induction (e.g., electrical energy) for powering various devices. However, kinetic energy generator-based actuation requires the step of initiating movement of the magnet from a rest position to a displaced position or active position. From the displaced or active position, the magnet can be released, and thereafter return, via oscillation, to the resting position.

In particular, the electrical energy generator system, as described in the present disclosure, comprises an energy generator actuation component, which is preloaded and prepositioned at a particular orientation. In particular, with respect to the preloaded and prepositioned position, the energy generator actuation component is constrained in an active or displaced position, in which magnetic potential energy is stored within the electrical energy system. Thereafter, the initiation of a triggering mechanism will remove any constraint associated with the energy generator actuation component. Consequently, the energy generator actuation component can return from the active or displaced position to the resting position (by operation of the stored magnetic potential energy being converted into kinetic energy). For example, the preloaded mechanism or triggering mechanism can include the use of a non-rigid material that is wound around a perimeter of an enclosure in which the energy generator actuation component can be disposed. In aspects, upon the dissolution of the non-rigid material, the preloading mechanism can trigger movement of a portion of the enclosure, which in turn can initiate the angular movement of the magnet from the displaced position to the resting position. As a result, electromagnetic induction can be generated, which can be harnessed to power various devices.

Figure 1:
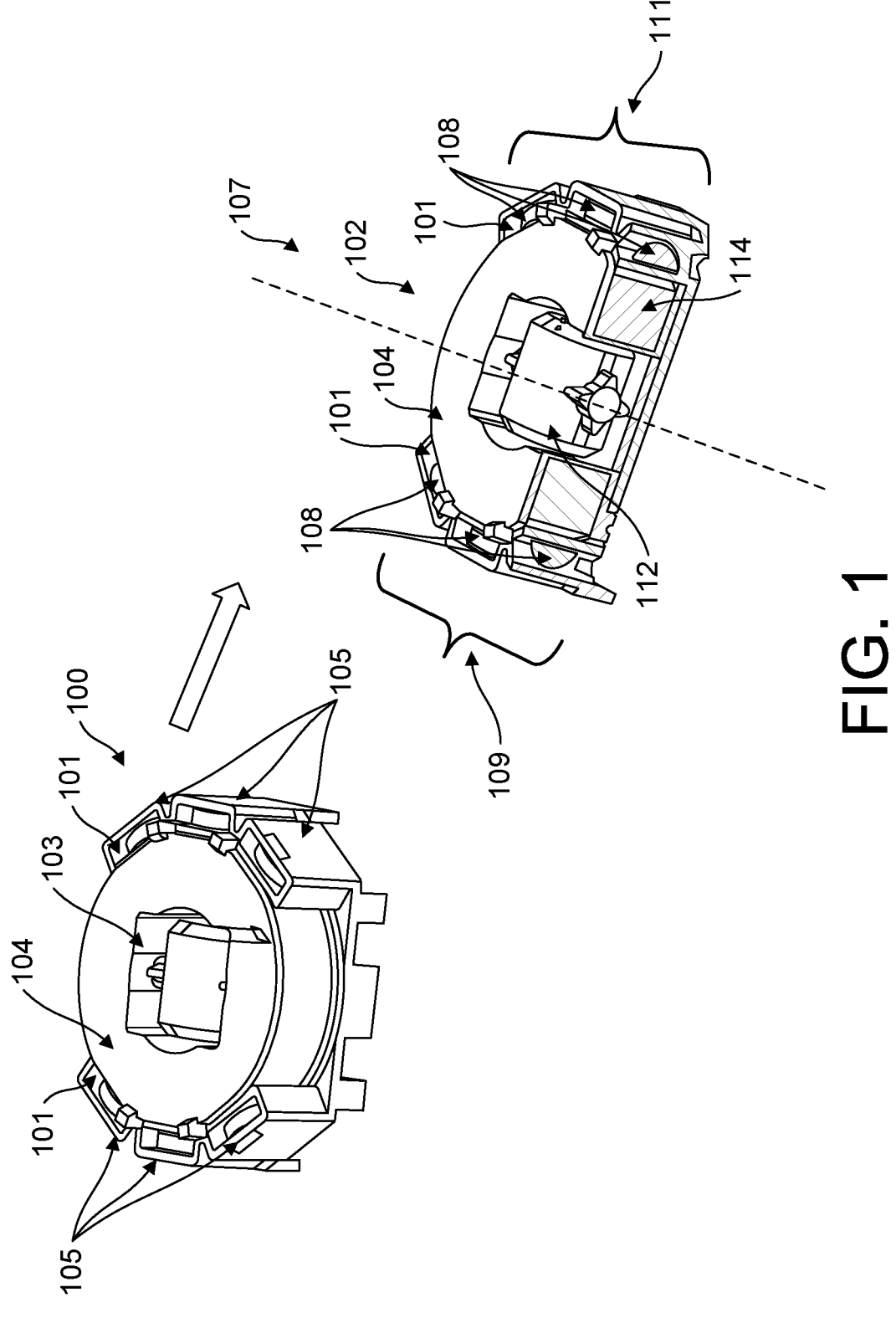
FIG. 1 depicts an example implementation of an energy generator actuation component and a cross sectional representation of the energy generator actuation component, in accordance with some aspects described herein.

FIG. 1 depicts an example implementation of an energy generator actuation component 100 and a cross section representation 102 of the energy generator actuation component 100 for enabling the generation of electrical energy as described in the present disclosure, in accordance with some aspects described herein. As illustrated, the energy generator actuation component 100 comprises an assembly 104 that can be formed of, e.g., hard plastic, or other comparable materials. An aperture 103 can be present in the center of the assembly 104 in which a primary magnet 112, having a substantially cylindrical shape, can be movably disposed. It is noted that the primary magnet 112 having a cylindrical shape is a non-limiting example, as the primary magnet 112 can be designed in a plurality of other shapes with varying dimensions. In aspects, the primary magnet 112 can move in an angular fashion along a longitudinal axis 107 as illustrated on the cross section representation 102 of the energy generator actuation component 100 of FIG. 1.

In aspects, an outer surface of the assembly 104 can include a plurality of protrusions 105. Each of the plurality of protrusions 105 can include respective apertures 101 in which secondary magnets 108 can be disposed. As illustrated in the cross section representation 102, each of the respective apertures on each of the plurality of protrusions 105 includes disk shaped magnets—the secondary magnets 108. The disk shape of the secondary magnets 108 is a non-limiting example, as the secondary magnets 108 can be designed in a plurality of other shapes with varying dimensions. The secondary magnets 108 can be housed within each of the plurality of protrusions 105. In aspects, a first set 109 of the secondary magnets 108 are positioned on one part of the outer surface of the assembly 104 in a partial arc shaped configuration and a second set 111 of the secondary magnets 108 are positioned on another part of the outer surface of the assembly 104 in a partial arc shaped configuration.

As illustrated, the first set 109 of magnets and the second set 111 of magnets are positioned opposite one another. Further, the first set 109 includes a polarity that aids or is complementary to the polarity of the second set 111. In aspects, the respective magnetic poles and/or fields of the first set 109 of the secondary magnets 108 and the second set 111 of the secondary magnets 108 align with the primary magnet 112 such that the magnetic fields of the secondary magnets 108 act upon the primary magnet 112, biasing movement of the primary magnet 112 in a particular direction, namely in line towards the resting position from the displaced position. In aspects, it is noted that the magnetic poles are aligned such that a rigid or static resting position is created for the primary magnet 112. Further, in aspects, a plurality of turns of wire 114 can be wound along the outer surface of the assembly 104 such that these wires are affixed on the outer surface. In aspects, the plurality of turns of wire can be formed of a conductive material, e.g., copper, nickel, and so forth. Other conductive materials having properties that are comparable to copper are also contemplated.

Figures 2A, 2B, 2C:
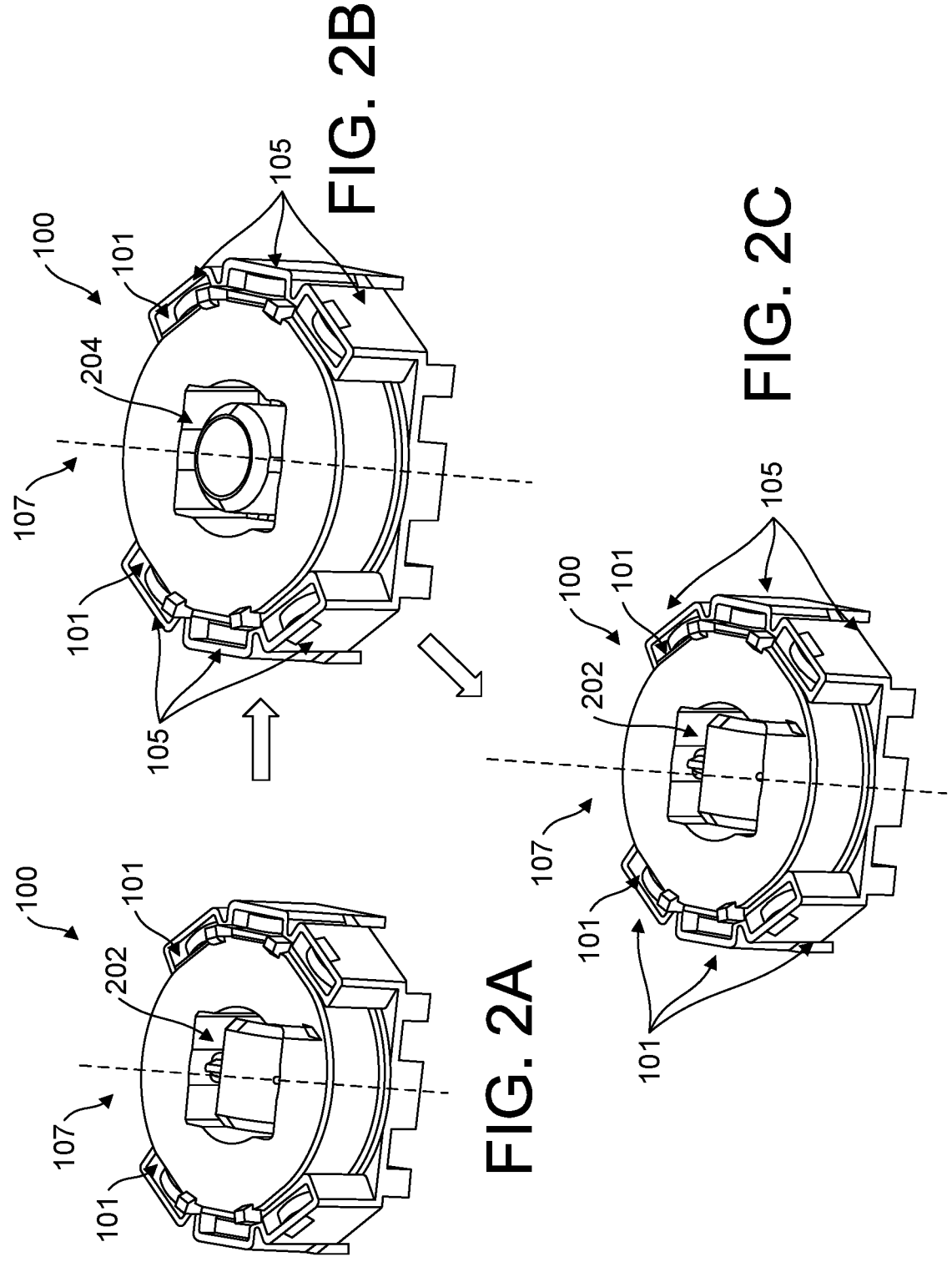
FIGS. 2A-2C depict two different orientations of the primary magnet disposed in the energy generator actuation component, in accordance with some aspects described herein.

FIGS. 2A-2C depict two separate and distinct positions or orientations of the primary magnet, according to some aspects described herein. In particular, in operation, the primary magnet 112 can perform an angular movement from a resting position 202 to a displaced position 204 along the longitudinal axis 107 and return to the resting position 202 due in part to the biasing force caused by the magnetic fields, as described above. As illustrated, the displaced position 204 is orthogonal to the resting position 202. In aspects, as the primary magnet 112 moves from the displaced position 204 to the resting position 202 (e.g., equilibrium position), the primary magnet 112 can oscillate a few times prior to being in a static position. Such angular motion of the primary magnet 112, primarily from the displaced position 204 to the resting position 202, results in angular acceleration, electro-magnetically induces a voltage in the plurality of turns of wire 114. The electromagnetic induction or electrical energy can be utilized to power various devices, e.g., radio frequency transmitters, transceivers, and so forth. Specifically, the energy generator actuation component 100 can utilize angular motion of the primary magnet 112 to generate electrical energy for the purpose for operating various devices.

When the primary magnet 112 in the displaced position 204, the magnetic poles of the primary magnet 112 are substantially opposite the left and right peripherals of the secondary magnets 108, as illustrated in FIGS. 1 and 2A-2C. Due to the positions of the secondary magnets 108 relative to the primary magnet 112, the primary magnet 112 can be oriented or wound to a position that is approximately 180 degrees from or relative to the resting position. Further, the magnetic fields generated as a result of the first set 109 of secondary magnets 108 and the second set 111 of secondary magnets 108 being positioned around the periphery of the assembly 104 and the primary magnet 112, result in the generation of a circuitous surrounding magnetic field. Such a magnetic field encompasses the plurality of turns of wire 114 and permeates throughout these wires. Magnetic induction occurs due to a time-rate change in the flux that passes through an interior portion of a center of a coil associated with the wires. As such, any time there is a movement of the primary magnet 112 (e.g., angular movement), the circuitous magnetic field is stretched and distorted through the windings, as a result of which the magnetic lines of force comprising the magnetic field are moved. Consequently, a voltage is provided in the plurality of turns of wire and subsequently utilized to power various devices. Broadly speaking, the polarities of the primary magnet 112 can be transitioned as the primary magnet 112 performs an angular movement from the displaced position 204 to the resting position 202.

Figure 3:
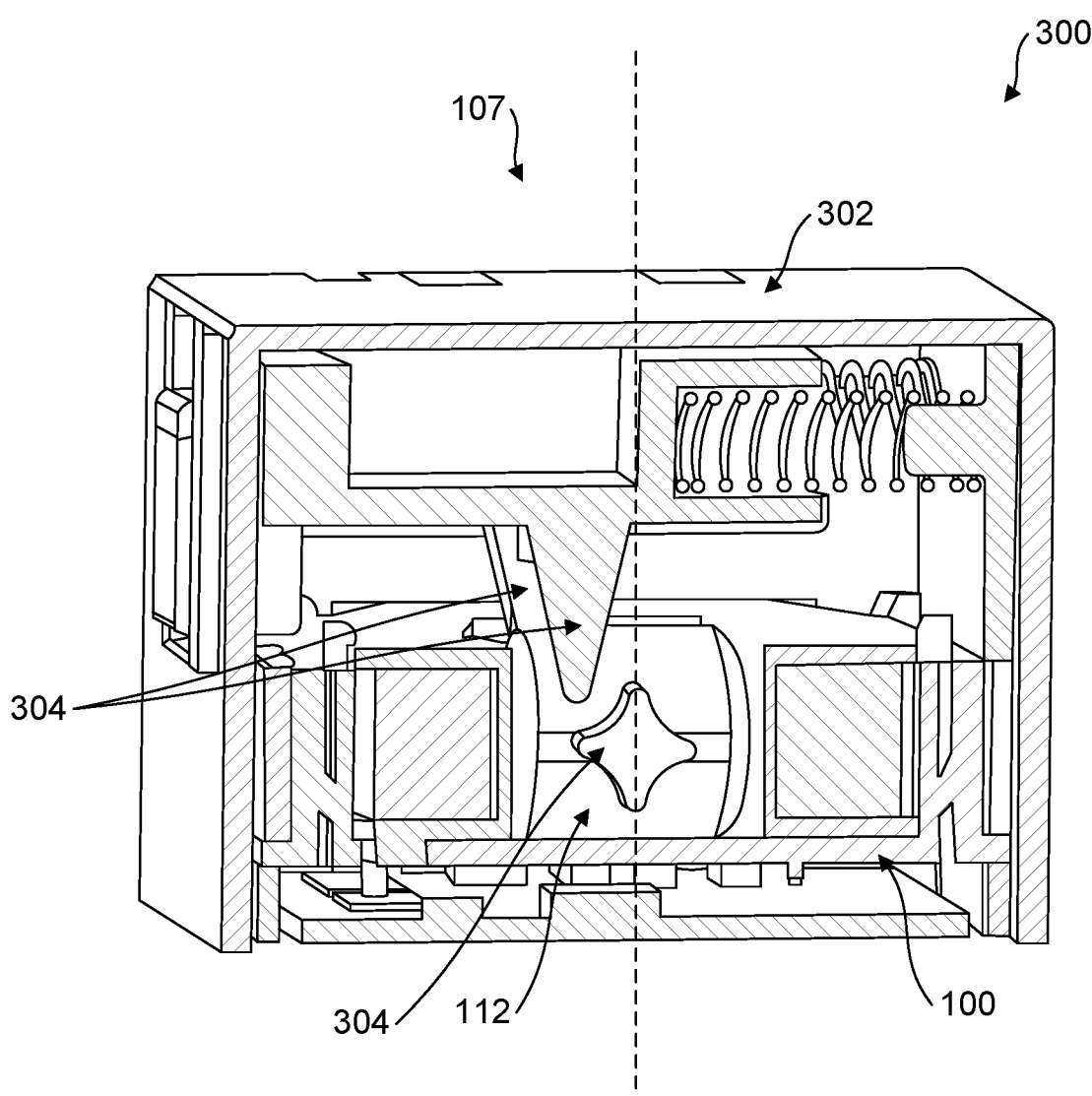
FIG. 3 depicts a cross sectional representation of an electrical energy generator system of the present disclosure disposed within an housing, which can be installed as part of a commercial industrial control switch, in accordance with some aspects described herein.

FIG. 3 depicts a cross sectional representation of an example electrical energy generator system 300 of the present disclosure disposed within an housing, which can be installed as part of a commercial industrial control switch, in accordance with some aspects described herein. The energy generator actuation component 100 can be positioned in other comparable components. As illustrated in the cross sectional representation, a control switch enclosure 302 of the example electrical energy generator system 300 can include actuator elements 304 that can move in a lateral direction. As a result of this lateral movement, actuator elements 304 can contact extensions 306 that protrude from two different portions on an outer surface of the primary magnet 112, and rotate the primary magnet 112 from the resting position 202 to the displaced position 204. As noted above, the displaced position 204 can be orthogonal to the resting position 202.

In aspects, as stated above, the primary magnet 112 can be oriented to approximately 180 degrees relative to the resting position. In aspects, from the displaced position 204, the primary magnet 112 can be released, which will begin the generation event, e.g., by the magnetic forces that operate to drive the primary magnet 112 to the resting (e.g., equilibrium) position. During this movement, oscillation can occur. As previously stated, such movement can generate electromagnetic induction in the plurality of turns of wire 114, which corresponds to electrical energy that is utilized to power various devices. Such operation of the energy generator actuation component 100 is transient energy generation event based operation that requires the actuator elements 304 to initiate movement of the primary magnet 112 to generate electromagnetic induction. Such transient energy generation event can be not suitable for all purposes and applications, e.g., a water sensor based application. Further, in aspects, if a load is placed on a coil that exceeds a particular threshold, the primary magnet 112 can operate to move from the displaced position to the resting position with reduced oscillation.

Figure 4A:
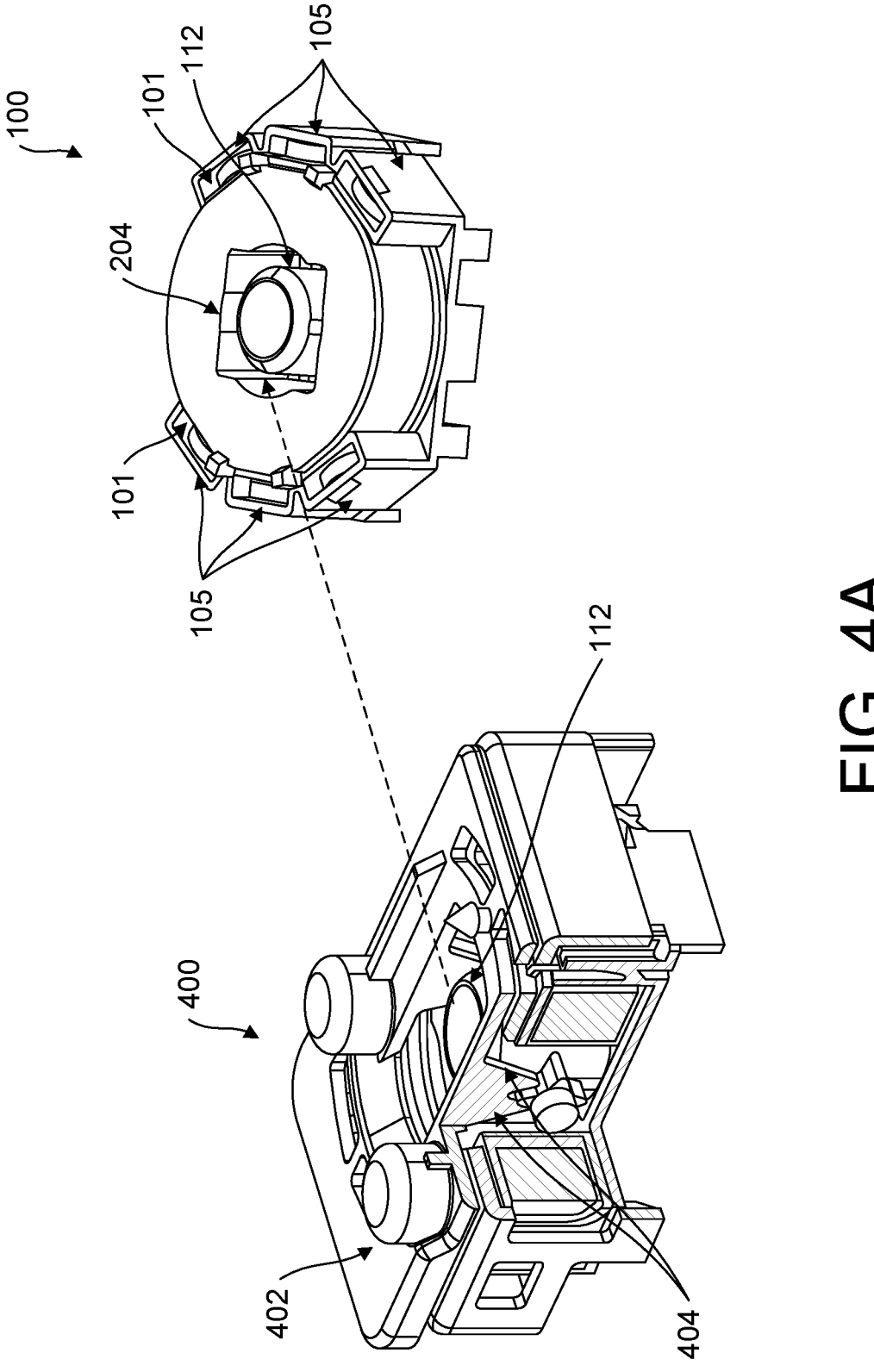
FIG. 4A depicts an example embodiment of an electrical energy generator system of the present disclosure, in accordance with some aspects described herein.

FIG. 4A depicts an example embodiment of an electrical energy generator system 400 of the present disclosure, in accordance with some aspects described herein. In particular, as illustrated in FIG. 4A, the example embodiment of the electrical energy generator system 400 can include a plastic enclosure (e.g., a movable cover) in which the energy generator actuation component 100 can be detachably positioned. A part of the movable cover 402 can operate to move in an upwards direction, as illustrated in FIG. 4A. In aspects, an interior portion of the movable cover 402 can include at least an engagement member or a plurality of engagement members 404. In aspects, these protrusions can have the shape of a curved portion that engages with a particular part of the primary magnet 112.

In aspects, contrary to the mechanically actuated transient generating device as described above with respect to FIG. 3, in the electrical energy generator system 400 of the present disclosure, the primary magnet 112 can initially be prepositioned in an active position. In particular, the primary magnet 112 can be prepositioned and retained in that position until the trip mechanism of the electrical energy generator system 400 acts on the primary magnet 112 to initiate movement of the primary magnet 112 from a displaced position to a resting position. Further, subsequent to such an orientation, the curved portions and the ends of the engagement members 404 can engage or couple with the outer surface of the primary magnet 112 to maintain the orientation of the primary magnet 112 in a particular position, e.g., the displaced position 204. Further, aspects and operation of the electrical energy generator system 400 is described in greater detail below with respect to FIGS. 4B, 4C, and 5.

Figure 4B:
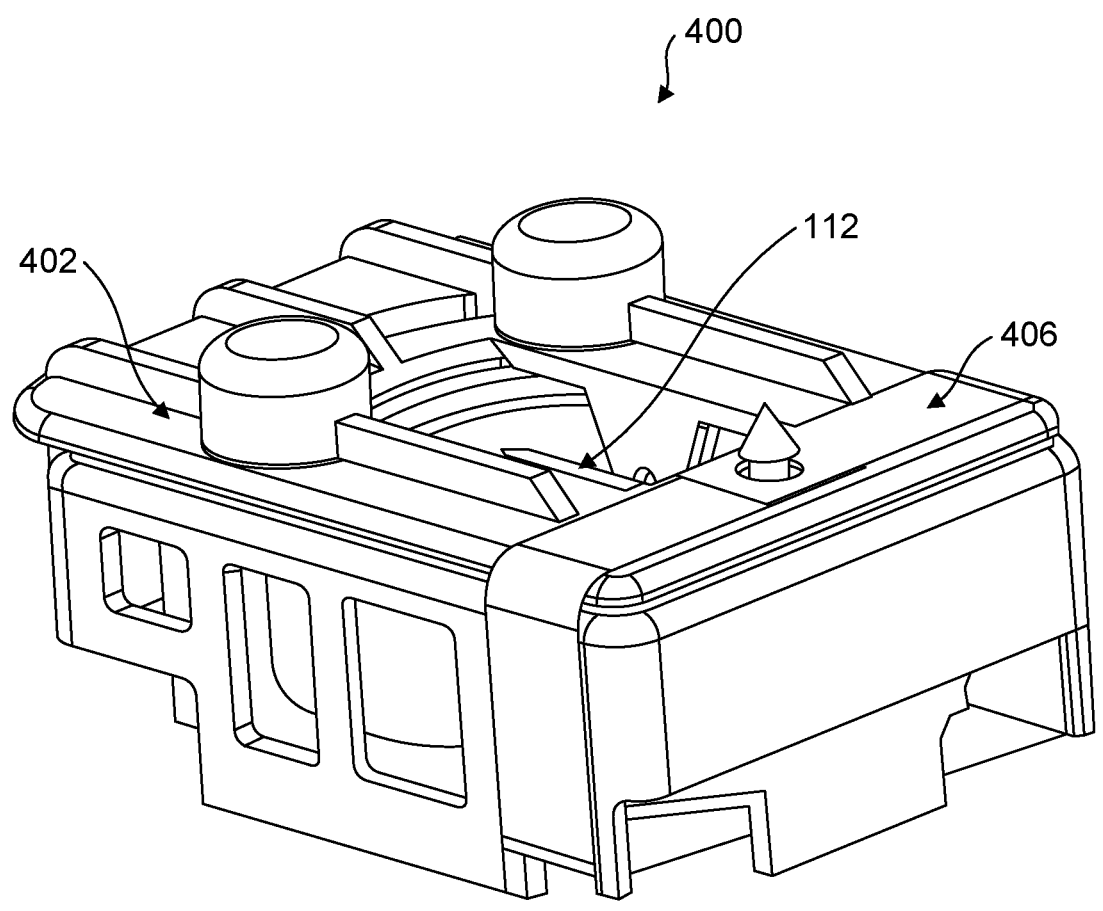
FIG. 4B depicts the inclusion of a non-rigid material positioned around an outer surface of the electrical energy generator system of the present disclosure, in accordance with some aspects described herein.

FIG. 4B depicts the inclusion of a non-rigid material 406 positioned on an outer surface of the electrical energy generator system 400 of the present disclosure, in accordance with some aspects described herein. As illustrated, the non-rigid material 406, which can be formed of paper, a dissolvable plastic, wax, or other comparable material, can be wound around the perimeter of a front portion of the movable cover 402, as illustrated in FIG. 4B.

Figure 4C:
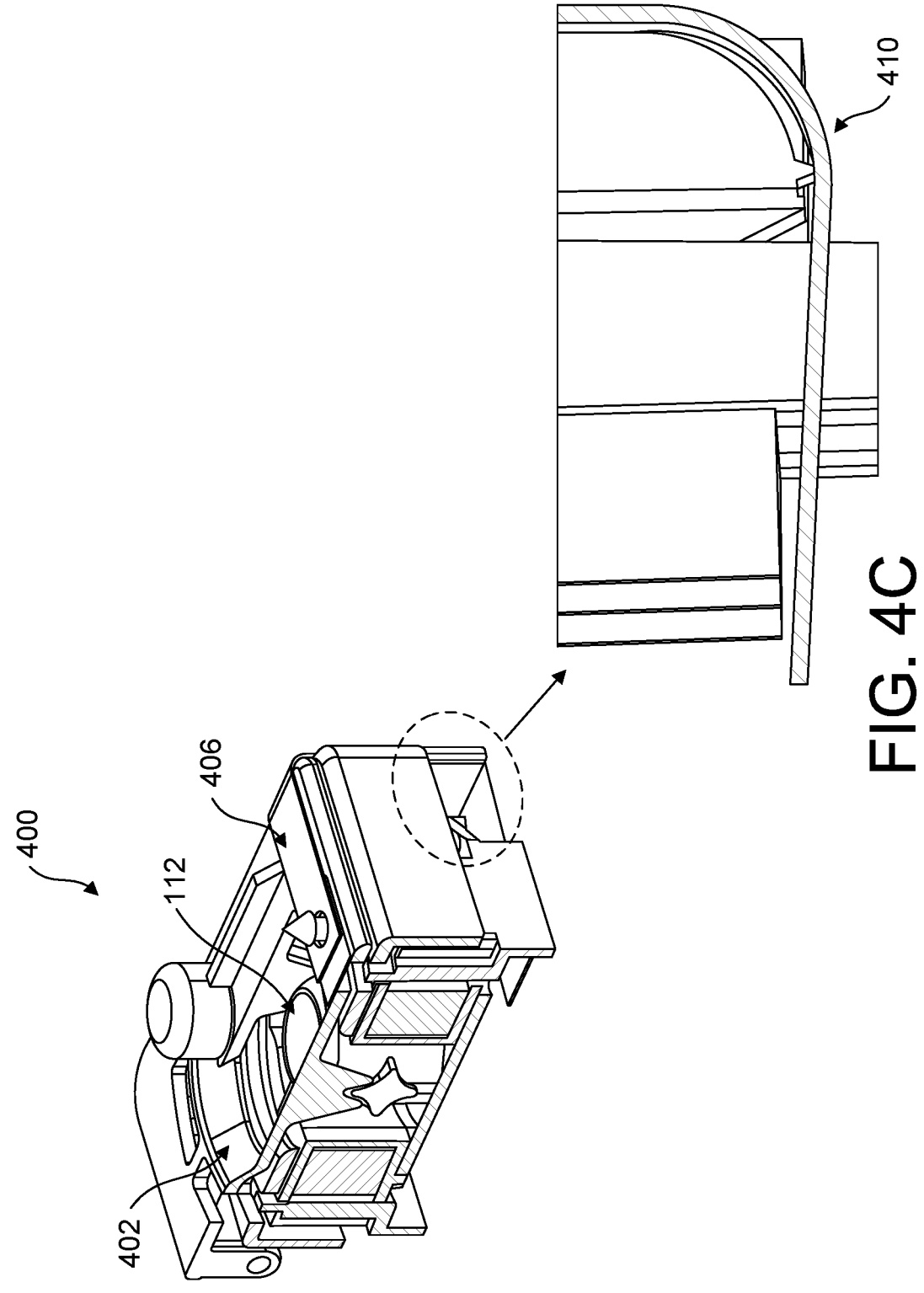
FIG. 4C depicts an expanded view of an extension included as part of the enclosure of the electrical energy generator system of the present disclosure, in accordance with some aspects described herein.

FIG. 4C depicts an expanded view of an extension included as part of the movable cover 402 of the electrical energy generator system 400 of the present disclosure, in accordance with some aspects described herein. In particular, as illustrated in the expanded view, an extension 410 can correspond to a stress-raiser that is designed to protrude from a bottom portion of the movable cover 402 such that the extension is positioned to directly contact the non-rigid material 406. In aspects, the shape and dimensions of the stress-raiser can vary. For example, the stress-raiser can correspond to sharp corners, grooves, notches, and so forth.

Figure 5:
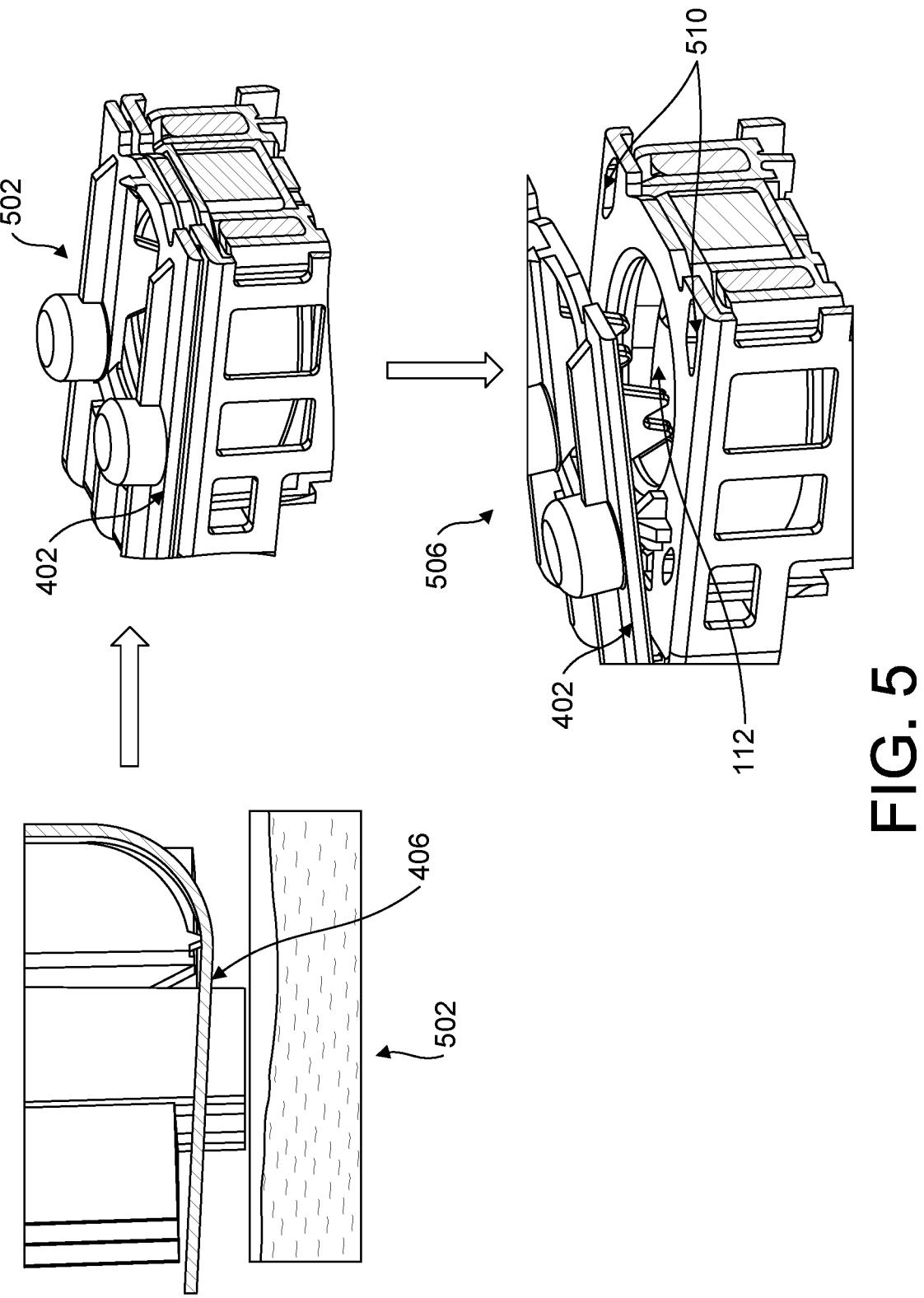
FIG. 5 depicts an example application of the electrical energy generator system, in accordance with some aspects described herein.

FIG. 5 depicts an example application of the electrical energy generator system 400, in accordance with some aspects described herein. In aspects, the electrical energy generator system 400 can be utilized as part of a water sensor that can be positioned in various parts of a residential or commercial facility to detect an increase in water levels above a particular threshold. In particular, as illustrated in FIG. 5, water 502 can rise to a particular threshold height and contact the non-rigid material 406 wound around the perimeter of a front portion of the electrical energy generator system 400 at the stress raiser point of contact. Upon contact with the water 502, the non-rigid material 406 can begin to deteriorate and dissolve, thereby triggering the movement of a part of the movable cover 402.

In particular, the dissolution of the non-rigid material 406 can trigger movement of a part of the movable cover 402 (e.g., spring loaded cover) from a closed positon 504 to an open position 506, e.g., with the use of one or more springs that are disposed in the spring apertures 510 positioned on the electrical energy generator system 400. As a result of this movement, the plurality of engagement members 404 can disengage from the extensions 306 disposed on the outer surface of the primary magnet 112, resulting in an angular movement of the primary magnet 112 from the displaced position 204 (as illustrated in FIG. 2) to the resting position 202 (also illustrated in FIG. 2). During disengagement, interior portions of engagement members 404 can no longer maintain contact with exterior portions of the extensions 306 (i.e. the star shaped components on outer surface of the primary magnet 112). Consequently, the magnetic field or magnetic poles of the secondary magnets 108 can act upon the orientation of the primary magnet 112 such that the primary magnet performs an angular movements towards a position that is orthogonal to the displaced position 204.

Further, while performing an angular movement to return to the resting position 202, which corresponds to a generation event, the primary magnet 112 can oscillate with respect to the longitudinal axis 107, e.g., (depending on the load), prior to coming to the resting position 202. The degree or extent of oscillation depends on the load. As explained above, as a result of such an angular movement, electromagnetic induction or electrical energy is generated and utilized to power various devices, e.g., radio frequency transmitters, transceivers, and so forth.

Figures 6A, 6B, 6C:
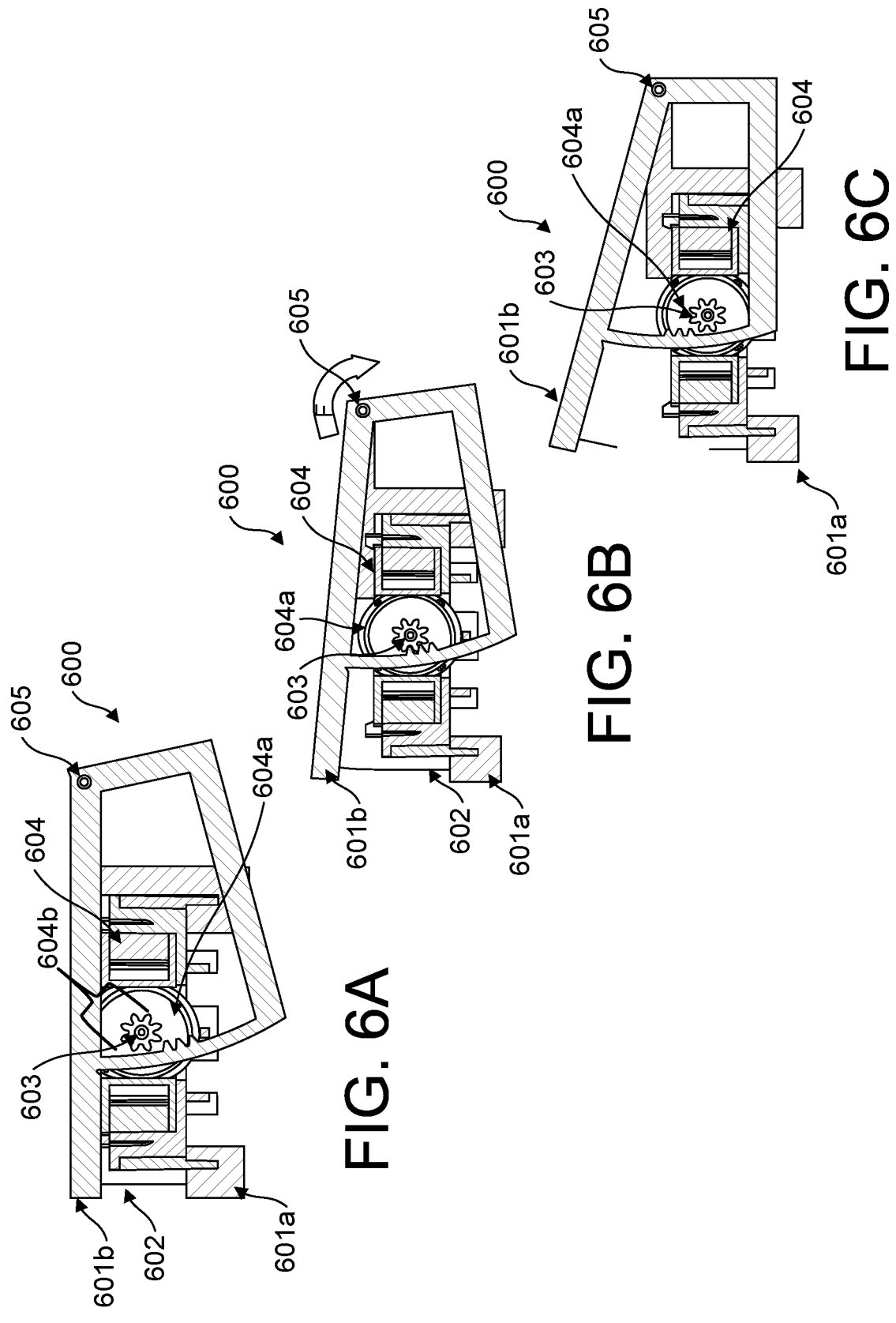
FIGS. 6A-6C depict different orientations of an example resettable trip mechanism based device, in accordance with some aspects described herein.

FIGS. 6A-6E depict different orientations of an example resettable trip mechanism based device 600 that, in some aspects, can incorporate an electrical energy generator such as those described elsewhere herein. As illustrated, such a device includes a film trigger 602 that is dissolvable. For example, the film trigger 602 can be a non-rigid material such as paper or wax, which is configured to dissolve when exposed to heat and/or water. As shown in FIG. 6A, the film trigger 602 is attached to a base 601*a* at a first end that is configured to retain an electrical energy generator 604 and to a movable portion 601*b* at a second end. The movable portion 601*b* is pivotally attached to the base 601*a* at a pivot point 605 and is configured to pivot relative to the base 601*a* about the pivot point 605 when the film trigger 602 dissolves, as described in further detail below.

As shown in FIG. 6A, the example resettable trip mechanism based device 600 can be set in an unactuated configuration in which the film trigger 602 is intact and holds the movable portion 601*b* of the example resettable trip mechanism based device 600 in a first, preloaded position as shown in FIG. 6A. In this configuration, engagement members 601*c*, formed on and protruding from the movable portion 601*b*, are positioned below corresponding engagement members 604*b* coupled to a primary rotor magnet 604*a* of the electrical energy generator 604 about an axis point 603. The primary rotor magnet 604*a*, in this exemplary embodiment, is configured to rotate about an axis extending through the axis point 603. as shown in FIG. 6B, upon dissolution of the film trigger 602 (as illustrated in FIG. 6B), there can be an upward rotation of the movable portion 601*b* of the example resettable trip mechanism based device 600 about the pivot point 605 to a second released position (illustrated in FIG. 6C) in which the movable portion 601*b* pivots about the pivot point 605. When this occurs, the engagement members 601*c* translate along an arcuate path such that one or more of the engagement members 601*c* contacts one or more of the engagement members 604*b* coupled to the primary rotor magnet 604*a*, resulting in rotational movement of the primary rotor magnet 604*a* and thereby causing the generation of energy in accordance with one or more of the exemplary energy generation methods described elsewhere herein.

In some aspects, the energy required to cause the movable portion 601*b* to pivot about the pivot point 605 to the position illustrated in FIG. 6C can be provided by a torsional flexure (not shown) that couples the movable portion 601*b* to the base 601*a* at the pivot point 605. The torsional flexure can be configured to store potential energy when the example resettable trip mechanism based device 600 is initially set in the first position illustrated in FIG. 6A and to act as a torsional spring such that it imparts a rotational force, in the direction F, on the movable portion 601*b* and such that tension is created in the film trigger 602. When the film trigger 602 dissolves, the movable portion 601*b* is no longer constrained from rotational movement about the pivot point 605, and the potential energy stored in the torsional flexure is converted into kinetic energy in the form of movement of the movable portion 601*b* to the second position illustrated in FIG. 6C, at which point the torsional flexure can be in equilibrium.

Figure 6E:
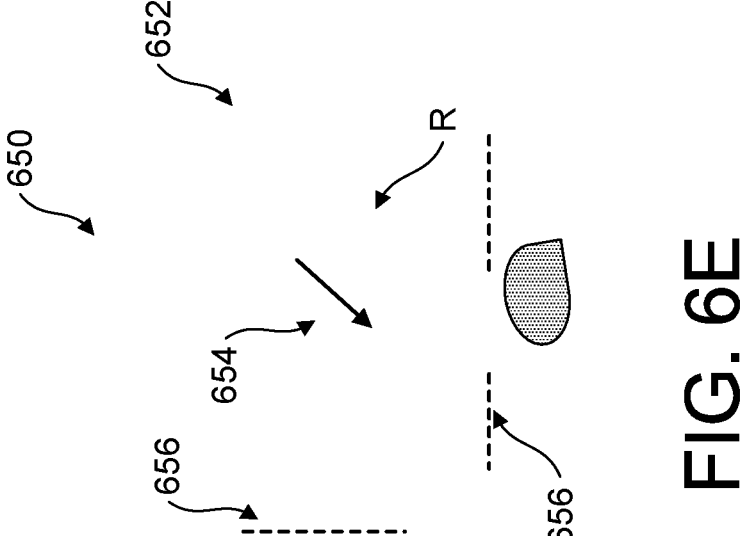
FIGS. 6D-6E depict an example device that includes a preloaded rotor with a trip device, in accordance with some aspects described herein.
Figure 6D:
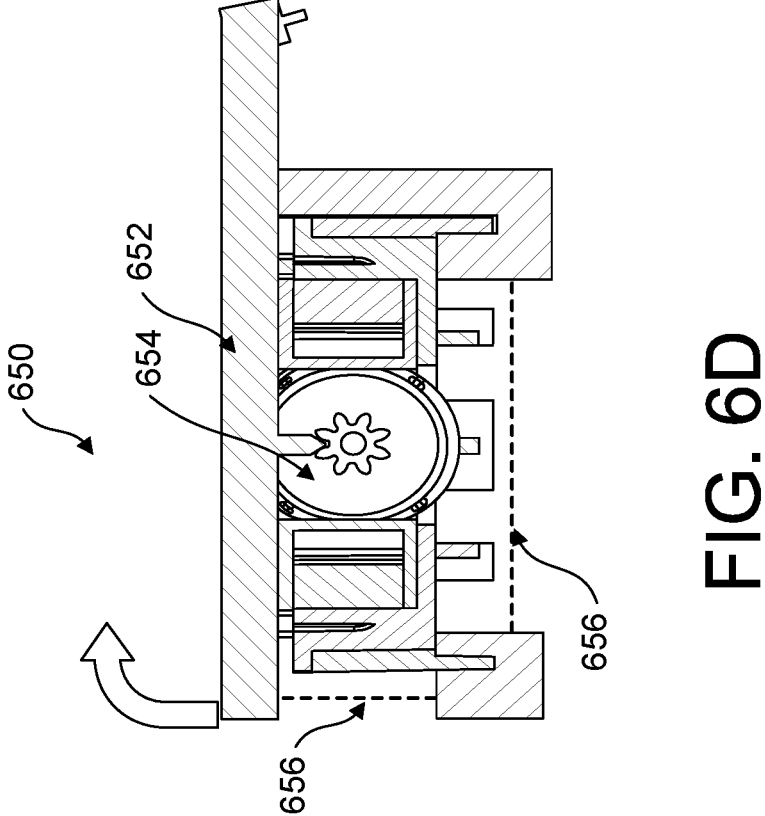

FIGS. 6D and 6E depict an example device 650 that includes an energy generation device (with a preloaded rotor magnet) that is incorporated into a trip device. In aspects, the example device 650 can be formed of single-molded pieces. In aspects, the example device 650 can include a flexure, such as the torsional flexure described above with respect to FIGS. 6A-6C, that acts as a spring for the purpose of releasing a rotor lock arm 652. In aspects, the rotor lock arm 652 can be maintained in position with mating teeth that are disposed on a rotor 654. In aspects, a rotor magnet can be wound up via an external magnet or mechanical wind mechanism to orient the rotor 654 at a particular position that is out of equilibrium, such as that illustrated in FIG. 6D. In aspects, a trip strip element 656 (e.g., paper) can be positioned at various portions of the example device 650 in order to maintain the rotor lock arm 652 in place as shown in FIG. 6D. Thereafter, as stated above, upon dissolution of the trip strip element 656, the rotor lock arm 652 can disengage from the rotor lock arm 652 and rotate upwards, as illustrated in FIG. 6E, thereby permitting the preloaded rotor to rotate in the direction of arrow R and thereby generating energy in accordance with one or more of the exemplary energy generation methods described elsewhere herein.

Figures 7A, 7B:
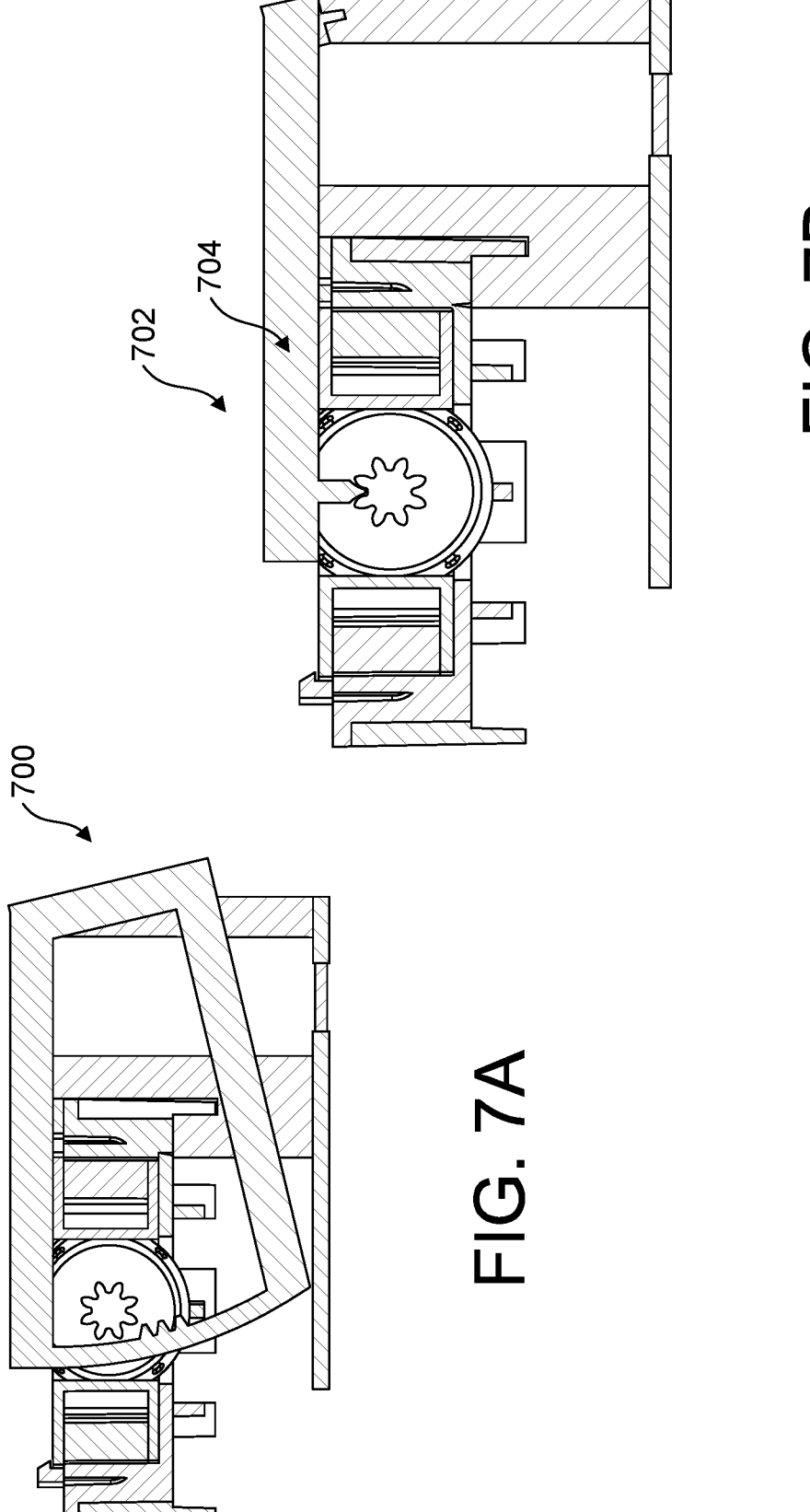
FIGS. 7A-7B depict variations of the devices depicted in FIGS. 6A and 6F, in accordance with some aspects described herein.

FIGS. 7A-7B depicts variations of the devices depicted in FIGS. 6A and 6F. As illustrated, FIG. 7A depicts an example device that operates with film in compression instead of tension. In particular, with respect to example device 700, a flexure is utilized to provide input for generating energy. With respect to example device 702, it is noted that this device involves the use of a rotor magnet that is preloaded or prepositioned out of equilibrium for the purpose of storing energy in a magnetic field, as opposed to a flexure. In aspects, the flexure energy is utilized for the purpose of releasing the rotor lock arm 704, which in turn results in rotation of the rotor for energy generation.

Figures 8A, 8B, 8C:
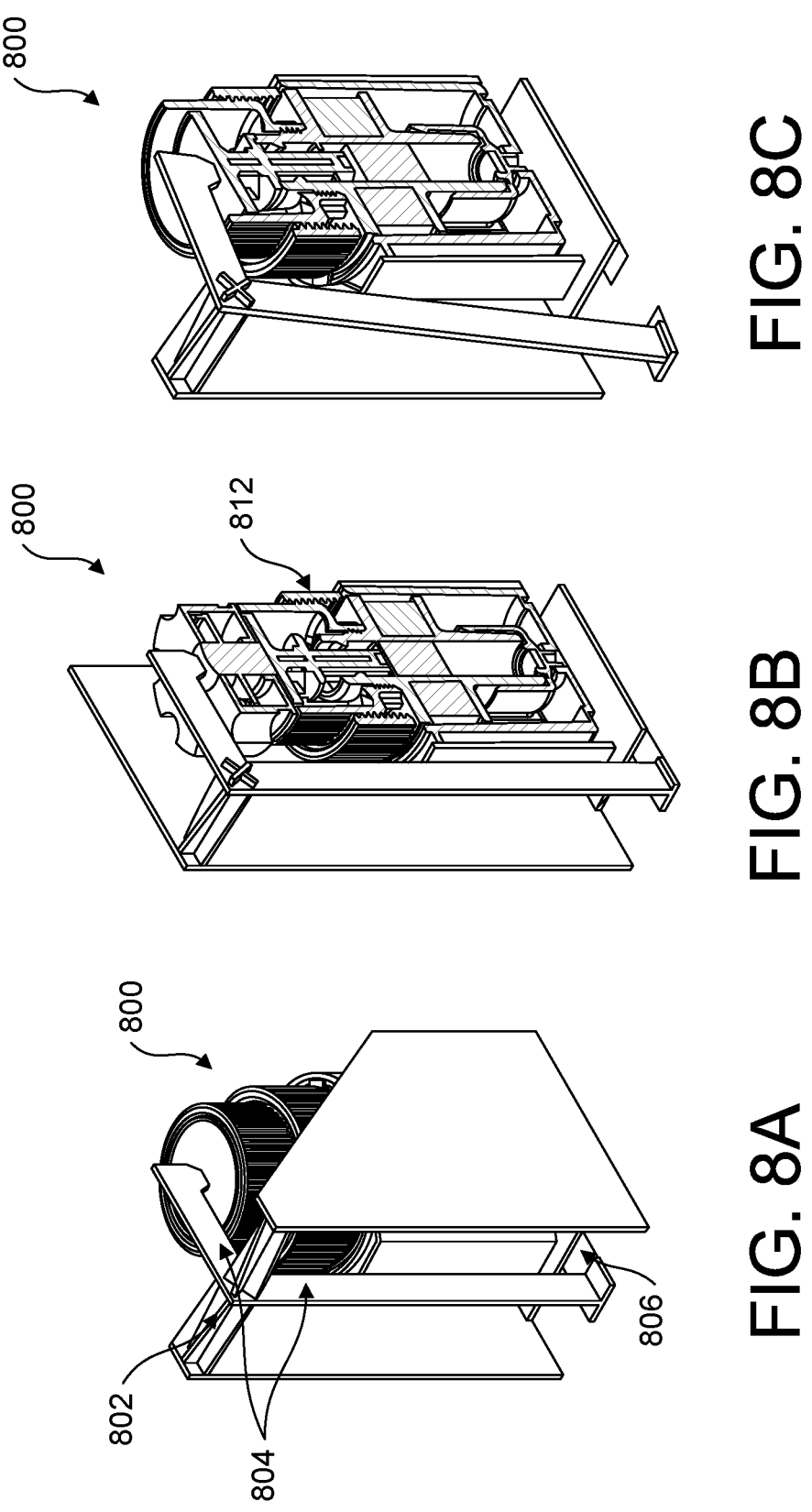
FIGS. 8A-8C depict another example trip activated device, in accordance with some aspects described herein.

FIGS. 8A-8C illustrate another example trip activated device. In aspects, the example trip activation device 800 includes a flexure 802, an actuating arm 804, and a film trip element 806. It is noted that the film trip element 806 maintains or retains the position of the flexure until the film included in the film trip element 806 dissolves or disintegrates. As a result, flexural energy is released, which actuates the actuating arm 804 to move to a different position, as illustrated in FIG. 8C. It is noted that the flexure provides all the energy for actuation. In aspects, the example trip activation device 800 includes a preloaded spring. In aspects, it is noted that four pounds of force can be required to actuate the example trip activation device 800. Further, in aspects, a coil spring can be included as part of the trip activation device 800, namely on an actuator button disposed on an energy generator 812 of the trip activation device 800 in order to preload and remove any force that is required for actuation. In aspects, the amount of force can be adjusted. In aspects, a low actuation force enables the design of a smaller flexure, which in turn enables for a reduced torque for actuating the example trip activation device 800. In aspects, a highly sensitive trigger mechanism can also be utilized, e.g., a shock sensor based trigger mechanism.

FIGS. 9A-9D depict an enclosure 900 in which the electrical energy generator system 400 of the present disclosure is disposed, according to one or more aspects described and illustrated herein. It is noted that all aspects of the electrical energy generator system 400 and the energy generator actuation component 100 described in the present disclosure can be disposed within the enclosure 900.

Figures 9A, 9B, 9C, 9D:
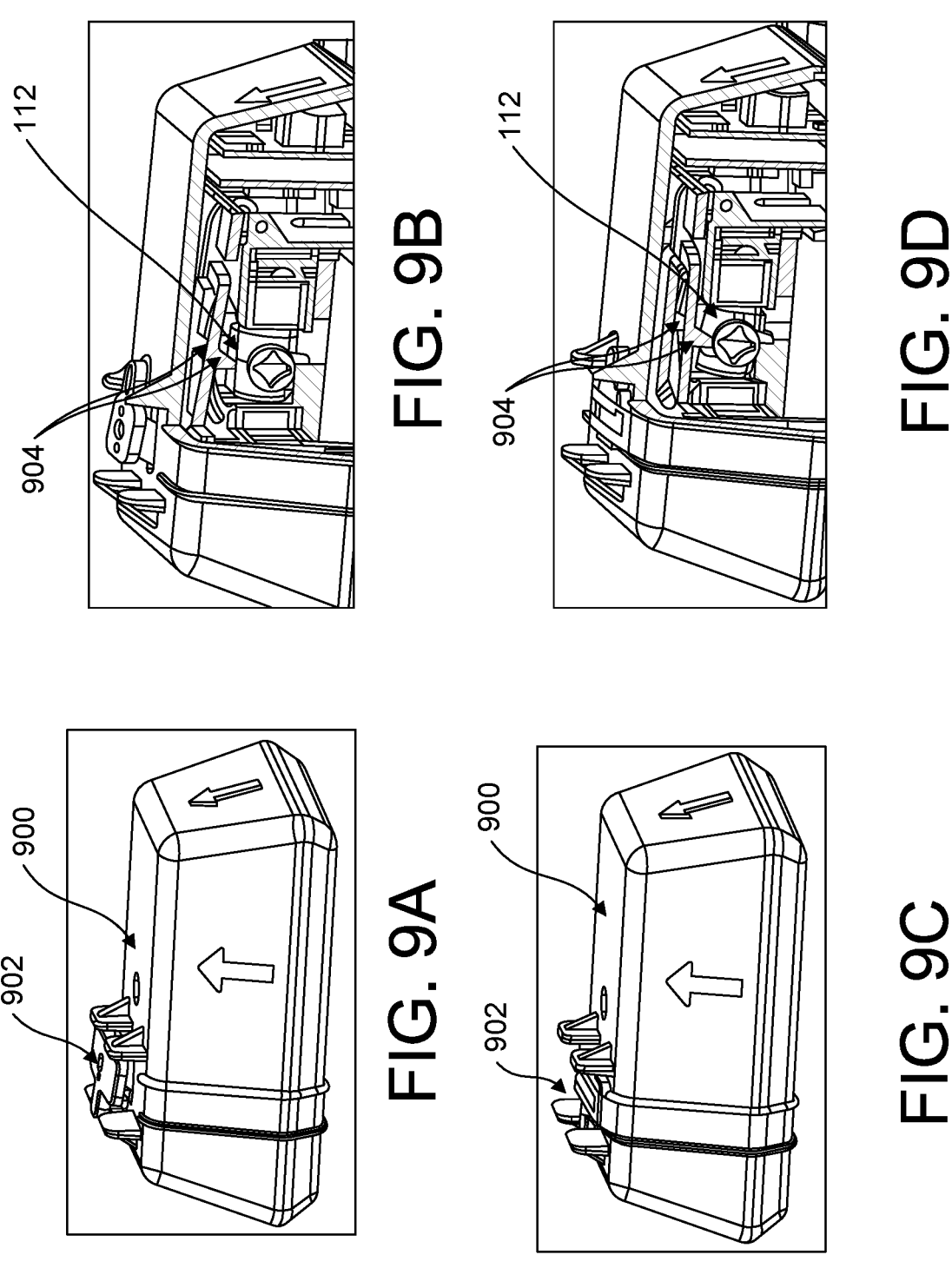
FIG. 9A depicts an enclosure with a latch that is oriented in a first position, in accordance with some aspects described herein.
FIG. 9B depicts a view of the positions of the internal components of the enclosure when the latch is in the first position, as shown in FIG. 9A, in accordance with some aspects described herein.
FIG. 9C depicts the enclosure with the latch in a second position, in accordance with some aspects described herein.
FIG. 9D depicts another view of the positions of the internal components of the enclosure when the latch is in the second position, as shown in FIG. 9C, in accordance with some aspects described herein.

FIG. 9A depicts the enclosure 900 with a latch 902 that is oriented in a first position. When the latch 902 in this position, the electrical energy generator system 400 can be in an unlocked position within the enclosure 900. The electrical energy generator system 400 includes the primary magnet 112, which can be oriented in a resting position after initiation of the triggering mechanism. Specifically, as illustrated in FIGS. 4A and 5, when the primary magnet 112 is in this position, the magnetic potential energy can be said to have been converted to kinetic energy, which in turn can be utilized to power devices. From this resting or post triggered position, a force will have to be imparted on the primary magnet 112 to, once again, instill magnetic potential energy in the primary magnet 112 (and by consequence in the electrical energy generator system 400) for future initiation of the triggering mechanism.

FIG. 9B depicts a view of the positions of the internal components of the enclosure 900 when the latch 902 is in the first position, as shown in FIG. 9A. In particular, when the latch 902 is oriented in the first position, parts 904 associated with the latch 902 are positioned at a location that is a particular distance away from the primary magnet 112 such that, in aspects, the parts 904 can be disengaged or disconnected from at least a portion of the primary magnet 112. In aspects, when the latch 902 is oriented in the first position, the primary magnet 112 is positioned in a static or resting position, as illustrated in FIG. 2A and described in the present disclosure.

FIG. 9C depicts the enclosure 900 with the latch 902 in a second position. When the latch 902 is in the second position, the electrical energy generator system 400 can be in a locked position within the enclosure 900. As stated above, when the primary magnet 112 is oriented in the displaced position from a resting position, magnetic potential energy can be instilled in the primary magnet 112. Thereafter, upon initiation of the triggering mechanism, e.g., due to the dissolution of the non-rigid material, the primary magnet 112 is released from its displaced position and moves in an angular manner towards a resting position, which results in the conversion of the magnetic potential energy to kinetic energy, which in turn is used to power various devices. It is noted that the displaced position corresponds to the primary magnet being oriented in a preset or active state and the resting position corresponds to the primary magnet being oriented in a post triggered or non-active state.

FIG. 9D depicts another view of the positions of the internal components of the enclosure 900 when the latch 902 is in the second position, as shown in FIG. 9C. In particular, when the latch 902 is oriented in the second position, the parts 904 can be engaged with or in contact with at least a part of the primary magnet 112.

Figures 10A, 10B, 10C:
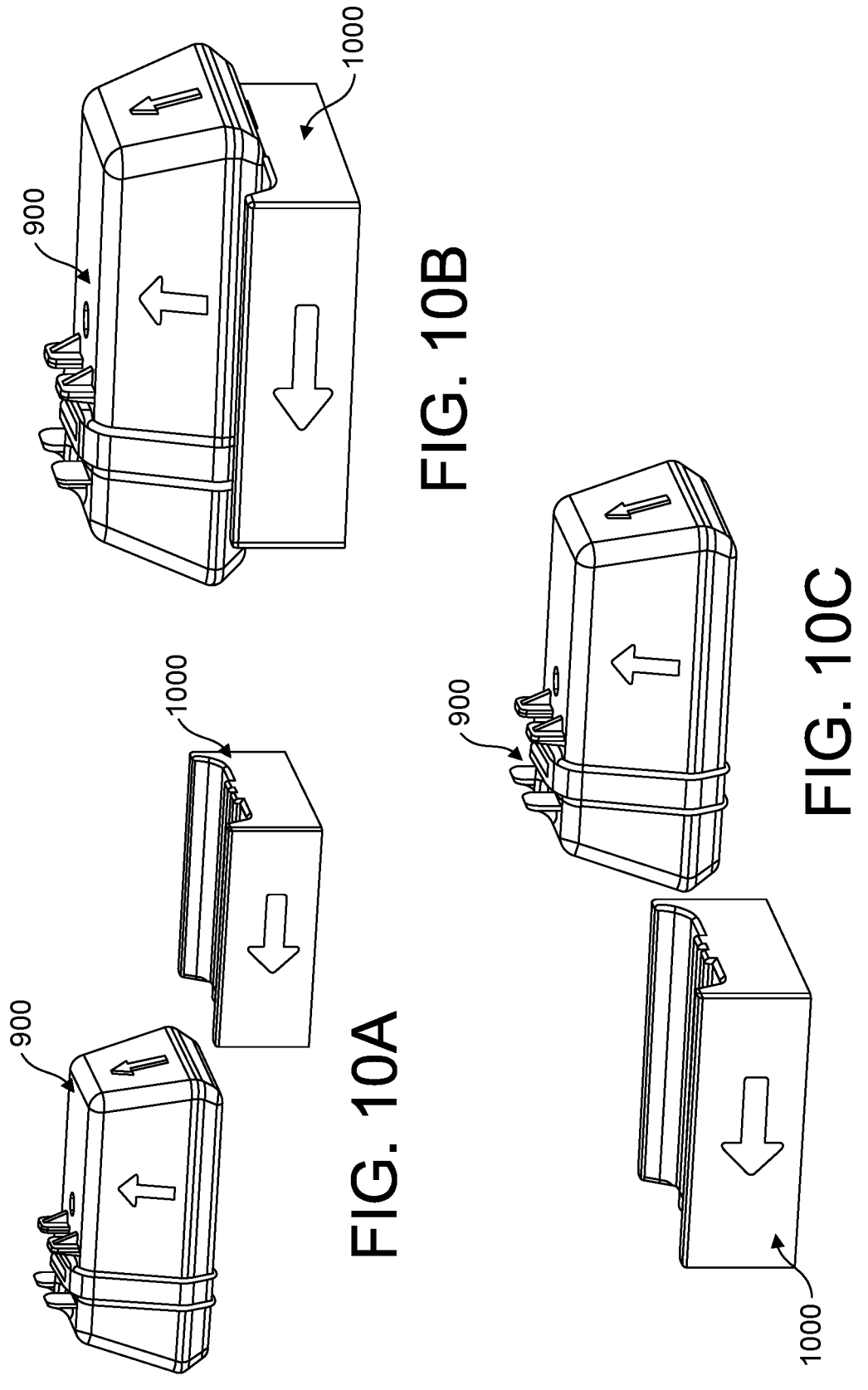
FIG. 10A depicts the enclosure and a tray that operates in conjunction with the enclosure to reset the positions of at least some of the internal components of the electrical energy generator system disposed in the enclosure, in accordance with some aspects described herein.
FIG. 10B depicts the enclosure in close proximity with a top surface of the tray, in accordance with some aspects described herein.
FIG. 10C depicts a completion of a movement of the enclosure relative to the top surface of the tray, in accordance with some aspects described herein.

FIGS. 10A-10C depict a resetting of the internal components of the electrical energy generator system 400 using a magnetic coupling system, according to one or more aspects described and illustrated herein. In particular, FIGS. 10A-10C depict a set of motions that result in the movement of the primary magnet 112 from a resting position to a displaced position. In the displaced position, the magnetic field of the primary magnet 112 is misaligned with or in disequilibrium relative to a number of secondary magnets, namely the first set 109 of secondary magnets 108 and the second set 111 of the secondary magnets 108, as illustrated in FIG. 1. From this position, when the triggering mechanism is initiated, the magnetic fields of the primary magnet 112 and the secondary magnets 108 move towards equilibrium, which in turn results in the movement of the primary magnet 112 from the displaced position (active or preset state) to the resting position (post triggered or non-active state). When the primary magnet 112 has completed the transition to the resting position, the magnetic fields of the primary and secondary magnets can be in equilibrium or alignment.

FIG. 10A depicts the enclosure 900 and a tray 1000 that operates in conjunction with the enclosure 900 to reset the positions of at least some of the internal components of the electrical energy generator system 400 disposed in the enclosure 900. In aspects, a plurality of magnets (not shown) can be detachably adhered to a surface of the tray 1000 (e.g., a bottom surface of the tray 1000). Thereafter, in aspects, the enclosure 900 can be moved from one side of the top surface of the tray 1000 to another side of the top surface of the tray 1000 to control the movement of the primary magnet 112 disposed in the enclosure 900. FIG. 10A illustrates the enclosure 900 on one side of the tray 1000.

FIG. 10B depicts the enclosure 900 in close proximity with a top surface of the tray 1000. In aspects, when the enclosure 900 is in such close proximity with the top surface of the tray 1000, the primary magnet 112 can begin moving from a resting position (non-active or post triggered state) to a displaced position (an active or preset state). When the enclosure 900 is in such close proximity with the top surface of the tray 1000, the magnetic field of the plurality of magnets adhered to a surface of the tray 1000 also come in close proximity to the magnetic fields of the primary magnet 112 and the secondary magnets 108, resulting in a misalignment of magnetic fields of the primary magnet 112 relative to the secondary magnets 108. Such misalignment causes a movement of the primary magnet 112 from the resting (post triggered or non-active state) to the displaced position (preset set or active state).

FIG. 10C depicts a completion of a movement of the enclosure 900 relative to the top surface of the tray 1000, as a result of which the primary magnet 112 reaches the displaced position (active or preset state) from its initial resting position. This displaced position can correspond to an orientation that is approximately 180 degrees relative to the resting position.

Figures 11A, 11B, 11C:
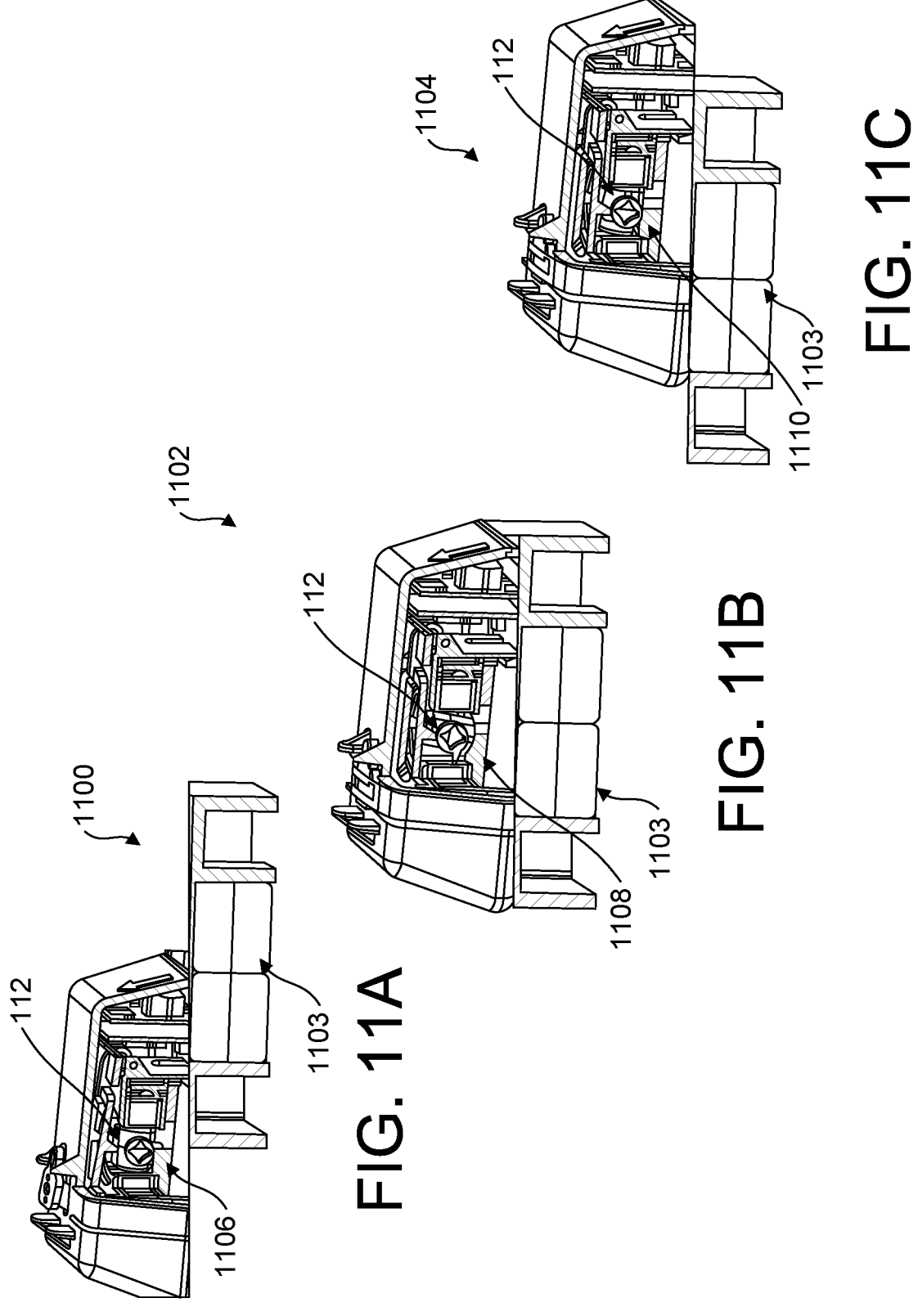
FIG. 11A illustrates a first view of the internal components of the enclosure when the enclosure is in a first position relative to the tray as shown in FIG. 10A, in accordance with some aspects described herein.
FIG. 11B illustrates a second view of the internal components of the enclosure when the enclosure is in a second position relative to the tray as shown in FIG. 10B, in accordance with some aspects described herein.
FIG. 11C illustrates a third view of the internal components of the enclosure when the enclosure is in a third position relative to the tray as shown in FIG. 10C, in accordance with some aspects described herein.

FIGS. 11A-11C illustrate views of the internal components of the enclosure 900 that correspond to each of the positions of the enclosure 900 relative to the tray 1000 depicted in FIGS. 10A, 10B, and 10C. FIGS. 11A-11C illustrate the movement of the primary magnet 112 from the resting position to the displaced position as a result of a change in proximity of the enclosure 900 to the magnets (e.g., tray magnets 1103) adhered to the bottom surface of the tray 1000. Specifically, as the enclosure 900 is moved along a substantially horizontal direction from a first location 1100 to a second location 1102, and then to a third location 1104, the magnetic fields of the tray magnets 1103 interact with the magnetic fields of the primary magnet 112 and the secondary magnets 108 such that there can be misalignment between the magnetic field of the primary magnet 112 relative to the secondary magnets 108. Consequently, the primary magnet 112 is moved from a resting position (post triggered or non-active state, as shown in FIG. 11A), to an orthogonal position as shown in FIG. 11B, and then to the displaced position (preset or active state, as shown in FIG. 11B).

FIG. 11A illustrates a first view of the internal components of the enclosure 900 when the enclosure 900 is in a first location 1100 relative to the tray 1000 as shown in FIG. 10A. Specifically, when the enclosure 900 is in the first location 1100 relative to the tray 1000 as shown in FIG. 10A, the primary magnet 112 remains in a non-active orientation 1106 (resting position).

FIG. 11B illustrates a second view of the internal components of the enclosure 900 when the enclosure 900 is in a second location 1102 relative to the tray 1000 as shown in FIG. 10B. Specifically, when the enclosure 900 is in the second location 1102 relative to the tray 1000 as shown in FIG. 10B, the primary magnet 112 moves from the non-active orientation 1106 to a position that can be substantially orthogonal to the non-active orientation 1106 (i.e. substantially orthogonal orientation 1108).

FIG. 11C illustrates a third view of the internal components of the enclosure 900 when the enclosure 900 is in a third location 1104 relative to the tray 1000 as shown in FIG. 10C. Specifically, when the enclosure 900 is in the third location 1104 relative to the tray 1000 as shown in FIG. 10C, the primary magnet 112 can move from the substantially orthogonal orientation 1108 to the active orientation 1110 (displaced position).

Further non-limiting aspects or aspects are set forth in the following numbered examples:

Example 1: An electrical energy generator system comprising: a movable cover including a plurality of engagement members and an energy generator actuation component, the energy generator actuation component being detachably positioned in the movable cover, a non-rigid material wound along a portion of an outer surface of the movable cover, the energy generator actuation component including: an enclosure that includes an aperture in a center of the enclosure and a plurality of protrusions disposed on parts of an outer surface of the enclosure, the plurality of protrusions including respective additional apertures, a primary magnet positioned in the aperture in the center of the enclosure, a plurality of secondary magnets, wherein each of the plurality of secondary magnets is positioned in a respective one of the respective additional apertures, wherein the primary magnet is maintained in a first position relative to the plurality of secondary magnets by the plurality of engagement members, a plurality of turns of wire wound along the outer surface of the enclosure, and wherein the primary magnet moves from the first position to a second position responsive to alteration of the non-rigid material.

Example 2: The electrical energy generator system of example 1, wherein the plurality of turns of wire are formed of copper.

Example 3: The electrical energy generator system of example 1 or example 2, wherein the non-rigid material is paper and the alteration of the non-rigid material corresponds to dissolution of the non-rigid material.

Example 4: The electrical energy generator system of any of examples 1 to 3, wherein the non-rigid material is formed of a dissolvable plastic.

Example 5: The electrical energy generator system of any of examples 1 to 4, wherein the second position is orthogonal to the first position.

Example 6: The electrical energy generator system of any one of examples 1-5, wherein the movable cover including an extension that contacts the non-rigid material that is wound along a different portion of the outer surface of the movable cover.

Example 7: The electrical energy generator system of any one of examples 1-6, wherein the primary magnet is maintained in the first position relative to the plurality of secondary magnets by the plurality of engagement members engaging a plurality of extensions disposed on an outer surface of the primary magnet.

Example 8: The electrical energy generator system of example 7, wherein in the second position, the plurality of engagement members of the movable cover disengage from the plurality of extensions disposed on the outer surface of the primary magnet.

Example 9: The electrical energy generator system of example 8, wherein the movement of the primary magnet from the first position to the second position responsive to dissolution of the non-rigid material comprises angular movement of the primary magnet from the first position to the second position.

Example 10: The electrical energy generator system of example 9, wherein the angular movement of the primary magnet from the first position to the second position comprises the primary magnet oscillating relative to a longitudinal axis.

Example 11: The electrical energy generator system of example 10, wherein in the second position, the plurality of engagement members of the movable cover disengage from the plurality of extensions disposed on the outer surface of the primary magnet for enabling the angular movement of the primary magnet from the first position to the second position.

Example 12: The electrical energy generator system of any one of examples 1-11, wherein the plurality of secondary magnets are positioned opposite the primary magnet.

Example 13: The electrical energy generator system of example 12, wherein: a magnetic pole of one of the plurality of secondary magnets, faces the primary magnet, and an additional magnetic pole of an additional one of the plurality of secondary magnets, faces the primary magnet.

Example 14: The electrical energy generator system of example 13, wherein a polarity of the magnetic pole is opposite of an additional polarity of the additional magnetic pole.

Example 15: The electrical energy generator system of any of examples 1-14, wherein the primary magnet is cylindrical and the movable cover is formed of metal.

Example 16: An electrical energy generator apparatus comprising a movable cover including a plurality of engagement members and an energy generator actuation component, the energy generator actuation component being detachably positioned in the movable cover, a non-rigid material wound along a portion of an outer surface of the movable cover, the energy generator actuation component including: an enclosure that includes an aperture in a center of the enclosure and a plurality of protrusions disposed on parts of an outer surface of the enclosure, the plurality of protrusions including respective additional apertures, a primary magnet positioned in the aperture in the center of the enclosure, a plurality of secondary magnets, wherein each of the plurality of secondary magnets is positioned in a respective one of the respective additional apertures, wherein the primary magnet is maintained in a first position relative to the plurality of secondary magnets by the plurality of engagement members, a plurality of turns of wire wound along the outer surface of the enclosure, and wherein the primary magnet performs an angular movement from the first position to a second position responsive to dissolution of the non-rigid material, wherein the angular comprises the primary magnet oscillating relative to a longitudinal axis.

Example 17: The electrical energy generator apparatus of example 16, wherein: the non-rigid material is paper and the alteration of the non-rigid material corresponds to dissolution of the non-rigid material, and the non-rigid material is formed of a dissolvable plastic or wax.

Example 18: The electrical energy generator apparatus of example 16, wherein the second position is orthogonal to the first position.

Example 19: A system comprising an enclosure an enclosure including at least a primary magnet, a tray, and at least a secondary magnet disposed on a surface of the tray, wherein the primary magnet moves from a first position to a second position responsive to a movement of the enclosure relative to the tray.

Example 20: The system of example 19, wherein the first position corresponds to a resting position and the second position is at an orientation of approximately 180 degrees relative to the first position.

What is claimed is:

1. An electrical energy generator system comprising:
a movable cover including at least one engagement member;
a non-rigid material wound along a portion of an outer surface of the movable cover;
an energy generator actuation component detachably positioned in the movable cover and including:
an enclosure that includes an aperture in a center of the enclosure and a plurality of protrusions disposed on parts of an outer surface of the enclosure, the plurality of protrusions including respective additional apertures, a primary magnet positioned in the aperture in the center of the enclosure, a plurality of secondary magnets, wherein each of the plurality of secondary magnets is positioned in a respective one of the respective additional apertures, wherein the primary magnet is maintained in a first position relative to the plurality of secondary magnets by the at least one engagement member, and a plurality of turns of wire wound along the outer surface of the enclosure; and wherein the primary magnet moves from the first position to a second position responsive to dissolution of the non-rigid material.

2. The electrical energy generator system of claim 1, wherein the wire is formed of copper.

3. The electrical energy generator system of claim 1, wherein the non-rigid material is paper and the dissolution of the non-rigid material corresponds to dissolution of the paper.

4. The electrical energy generator system of claim 1, wherein the non-rigid material is formed of a dissolvable plastic.

5. The electrical energy generator system of claim 1, wherein the second position is orthogonal to the first position.

6. The electrical energy generator system of claim 1, wherein the movable cover includes an extension that contacts the non-rigid material and is wound along a different portion of the outer surface of the movable cover.

7. The electrical energy generator system of claim 1, wherein the primary magnet is cylindrical and the movable cover is formed of metal.

8. The electrical energy generator system of claim 1, wherein the plurality of secondary magnets are positioned opposite the primary magnet.

9. The electrical energy generator system of claim 8, wherein:

a magnetic pole of one of the plurality of secondary magnets, faces the primary magnet; and an additional magnetic pole of an additional one of the plurality of secondary magnets, faces the primary magnet.

10. The electrical energy generator system of claim 9, wherein a polarity of the magnetic pole is opposite of an additional polarity of the additional magnetic pole.

11. The electrical energy generator system of claim 1, wherein the primary magnet is maintained in the first position relative to the plurality of secondary magnets by the plurality of engagement members engaging a plurality of extensions disposed on an outer surface of the primary magnet.

12. The electrical energy generator system of claim 11, wherein in the second position, the plurality of engagement members of the movable cover disengage from the plurality of extensions disposed on the outer surface of the primary magnet.

13. The electrical energy generator system of claim 12, wherein the movement of the primary magnet from the first position to the second position responsive to the dissolution of the non-rigid material comprises angular movement of the primary magnet from the first position to the second position.

14. The electrical energy generator system of claim 13, wherein the angular movement of the primary magnet from the first position to the second position comprises the primary magnet oscillating relative to a longitudinal axis.

15. The electrical energy generator system of claim 14, wherein in the second position, the plurality of engagement members of the movable cover disengage from the plurality of extensions disposed on the outer surface of the primary magnet for enabling the angular movement of the primary magnet from the first position to the second position.

16. An electrical energy generator apparatus comprising:

an enclosure that includes an aperture in a center of the enclosure;

a primary magnet positioned in the aperture in the center of the enclosure;

a plurality of turns of wire wound along an outer surface of the enclosure;

a plurality of secondary magnets positioned around parts of the outer surface of the enclosure;

a latch movable between a locked position and an unlocked position, wherein the latch is configured to maintain the primary magnet in an active state in the locked position; and a non-rigid material configured to be wound along a portion of an outer surface of the enclosure to secure the latch in the locked position, wherein responsive to dissolution of the non-rigid material, the latch is configured to move to the unlocked position causing the primary magnet to be released from the active state and set to oscillate about a longitudinal axis thereby inducing a voltage in the plurality of turns of wire.

17. The electrical energy generator apparatus of claim 16, wherein the non-rigid material is any one of a paper material, a dissolvable plastic material, or a wax material.

18. The electrical energy generator apparatus of claim 17, wherein the electrical energy generator apparatus is a water sensor and the non-rigid material configured to dissolve responsive to exposure to water.

\* \* \* \* \*